United States Patent [19]
Beshay

[11] Patent Number: 5,264,028
[45] Date of Patent: Nov. 23, 1993

[54] MODIFIED WAXES AND APPLICATIONS THEREOF

[76] Inventor: Alphons D. Beshay, 3595 de Courval, Trois, Rivières, P.Q., Canada, G8Z 1S8

[21] Appl. No.: 779,946

[22] Filed: Oct. 21, 1991

[30] Foreign Application Priority Data

Oct. 23, 1990 [CA] Canada ............................ 2028277

[51] Int. Cl.$^5$ ............... C09D 191/06; C09D 191/08; C08L 91/06; C08L 91/08
[52] U.S. Cl. ........................... 106/270; 106/14.34; 106/14.35; 106/14.36; 106/660; 522/2; 522/126; 522/129; 522/130; 526/290; 528/484; 528/490; 528/492
[58] Field of Search ............ 106/14.34, 14.35, 270, 106/14.36, 660; 522/2, 126, 130, 129; 526/290; 528/485, 490, 472

[56] References Cited

U.S. PATENT DOCUMENTS

| | | | |
|---|---|---|---|
| 4,082,558 | 4/1978 | Nobuo | 106/270 |
| 4,118,244 | 10/1978 | Selwitz et al. | 106/270 |
| 4,153,468 | 5/1979 | Bienvenu | 106/270 |
| 4,720,555 | 1/1988 | Nash | 106/270 |

*Primary Examiner*—David Brunsman
*Attorney, Agent, or Firm*—Alphons D. Beshay

[57] ABSTRACT

Waxes and polymeric waxes can graft with a coupling agent by employing a radical process. The resulted grafted waxes can be applied:
1. For Coating and bonding with surfaces of materials to be applied as water-proofing antirust and reinforcing fillers.
2. As enhancing coupling agent to bond with plastics, rubber and asphalt.
3. As adhesive materials.

8 Claims, No Drawings

MODIFIED WAXES AND APPLICATIONS THEREOF

FIELD OF THE INVENTION

This invention relates to wax materials; more specifically, it relates to the bonded or modified waxes to be employed as better surface coatings or coupling agents. This is to improve the surface physical properties of materials or to improve the physicomechanical properties of materials or a composition thereof, or to be applied as adhesive materials.

BACKGROUND OF THE INVENTION

The treatments of waxes are known in the art. In addition, the preparations of synthetic and polymeric waxes and their industrial applications are also known in the art since long. For example:

The Japanese Patent No. 76,124,131, Oct. 29, 1976, teaches mixing of wax with ammonium silicate and metal oxide or hydroxide to be applied as water and alkalie resistant for building materials.

The Japanese Patent No. 7,708,198, Jan. 21, 1977, teaches the coating of reinforced yarns with polydimethylsiloxane and wax.

The Japanese Patent No. 7,763,247, May 25, 1977, teaches the recoating of oxidised wax with unsaturated monomer to give a hot-molten adhesive.

Britt, A. D. et al, Pyrotechnology symposium 1976, 1-D, found that the free radicals can be trapped by waxes or binders to be employed for explosives.

The USSR Patent No. 597,666, Mar. 15, 1978, teaches that waxes can be modified by reacting with ethylene glycol and maleic anhydride in presence of peroxide.

The Japanese Patent No. 95,191,704, Oct. 30, 1984, teaches the preparations of styrene grafted polyolefinic wax (e.g. PE high wax) can be applied as a released agent.

The U.S. Pat. No. 4,444,243, Apr. 10, teaches the polymerix wax, e.g. maleiated PP or sulphonated PP, improve the tensile strength and durability of mica reinforced thermoplastic composites.

The U.S. Pat. No. 4,820,749, Apr. 11, 1989, teaches that plastics and rubbers can be dramatically reinforced by being filled with cellulosic fibers pregrafted with silane coupling agents by radicals.

This invention is considered as a continuation of Beshay's previous inventions (U.S. Pat. Nos. 4,717,742 and 4,820,749, CA 1,252,563 and 1,269,187), dealing with grafting of coupling agents onto natural macromolecules, i.e. cellulose, lignin and starch to reinforce plastics and rubbers. Said continuation of the instant invention is for grafting the coupling agents onto materials of high molecular weights such as waxes, oils and proteins and applications thereof.

BRIEF DESCRIPTION OF THE INVENTION

It has now been discovered that grating a coupling agent onto a wax material gives a grafted wax with coupling agent; that is to be applied as improved surface treating and coating agent, interfacial coupling agent and an adhesive material.

In comparing the testing results which can be fulfilled by employing a simple process as concerns the preparation of grafted wax with a coupling agent to those results obtained by either employing the coupling agent or the wax individually or mixed together, but in absence of internal molecular bondings between each other, a remarkable great difference can be noticed due to the grafted wax.

The radical process is one of the processes for grafting wax with a bonding agent.

Hot-molten wax can be initiated by employing an initiation process to bond with a coupling agent. The resulting material can be applied for numerous useful industrial applications.

DETAILED DESCRIPTION OF THE INVENTION

The subject of the invention relates to bonded waxes and applications thereof.

One embodiment of the instant invention is to decrease the weight ratios of the consumed coupling agents and, accordingly, the cost effective.

Second embodiment is to fulfill remarkable improvements in the physical properties of the coated materials' surfaces, i.e. to have strong and durable adherence resulting in improved water and alkalie resistance and size stability under the different environmental conditions.

A third embodiment is to improve the interfacial bonding strength between a composition of materials and, hence, the physicomechanical properties of the resulted composites improve accordingly.

A fourth embodiment for the instant invention that it can be carried out in absence of any chemical solvents, which leads to time, energy and cost savings as well as being an environmental discontaminant.

A fifth embodiment of this invention is the grafted wax with a coupling agent characterized by having long-shelf life property.

The grafted waxes with a bonding agent can be employed as improved interfacial coupling agent for different materials and/or as improved surface coating agent. That is to be applied in the known wax applications and/or in the known coupling agents applications.

For example, as water repellents and/or as coupling agents for wide variety of materials such as wood, cartons, paper, yarns, textiles' fabrics, cords, natural or synthetic short or long fibers, cement, concrete, gypsum, thermoplastic and thermosetting polymers, rubber, asphalt, metals, inorganic fillers or the like.

It can also be employed as a rust-proofing material for painted or non-painted steel or automobile bodies or the like.

It is also useful in the interfacial bonding of wood particles and wood chips for manufacturing wood boards and pannels.

The polymeric waxes such as polypropylene wax and polyethylene wax or the like can graft with a coupling agents to be employed for different applications, among which as adhesive materials, binders or as reinforcing agents for copolymers, polymer blends, polymer composites, rubber and asphalt.

The grafted wax with a coupling agent can also be applied to bond with cellulosic materials, starch, lignin, organic and/or inorganic filler materials to reinforce synthetic thermoplastic and thermosetting polymers, rubber, asphalt, cement, concrete and gypsum. In addition, it can also be employed for bonding textiles, fabrics, cartons, paper, wood or cellulosic fibers with thermoplastic or thermosetting polymer films or rubber films.

As a process for grafting wax with a coupling agent, the wax is simply initiated by a radiation or chemical initiation process. The chemical initiation could be a peroxide, e.g. dicumyl peroxide which can be added to a certain weight of the hot-molten wax while stirring, followed by the addition of a certain weight of a coupling agent such as silane bonding agent, e.g. prehydrolyzed gamma-methacryloxypropyletrimethoxysilane. After a fixed time, the reactants are cooled down to be ready for being employed for said different purposes and applications.

Solvents can be employed either for wax, initiator and/or the bonding agent. The solvent can also be employed for the resulted grafted waxes and/or for some of the treated materials such as plastics or rubbers or others.

The reaction mechanism of grafting the wax with the coupling agent is not yet exactly known, but it could be predicted that a part of the hot-molten wax can work as a free radical catching or trapping agent when solidified by cooling. The free radicals arising from the other part of the wax and from the coupling agent by the effect of the instant initiator can partially be bonded together to give covalent bonded wax with the coupling agent. In addition, the other part of the trapped radicals can bond with the molecules on the materials' surfaces to create interfacial strong bondings.

However, this invention is not limited to such materials, nor to their weight ratios; it shows its useful advantages by employing any kind of wax, oils, grease, proteins or the like.

The means for generating free radicals is preferably accomplished by using a free radical catalyst, such as a peroxide (for example, t-butyl perbenzoate, dicumyl peroxide, methylethyl ketones peroxide, benzoyl peroxide, di-t-butyl peroxide and 2,5-dimethyl-2,5-di(t-butyl peroxy) hexane. A more detailed compilation of free radical initiators which may be used is set forth at pages 11-3 to 11-51 of "Polymer Handbook", Inter-science Publishers (1966) or the like.

Also the grafting process can be carried out by the initiation effect of gamma-radiation, U.V. radiation or any other effective process for grafting the wax with a coupling agent.

The ethylenically unsaturated carboxylic acid or acid anhydride could be employed as an auxiliary agent in the practice of this invention. It is preferable be a dicarboxylic acid, such as maleic acid, maleic anhydride, fumaric acid, citraconic acid, or itaconic acid. Maleic anhydride is the preferred auxiliary agent. Monocarboxylic acids such as acrlylic acid and methacrylic acids may also be used. Instead of maleic anhydride polymaleic anhydride, succinic anhydride or any acid/acid anhydride and the like may be used.

The waxes that can be used in the instant invention are those derived from animal, vegitable or mineral waxes. The animal wax such as bees wax, lanoline wax, Shellac wax, Chinese insects' wax or the like.

The vegitable' wax such as Carnouba wax, Candelilla wax, Bayberry wax, sugarcane wax, Cuticle wax or the like.

The mineral waxes are those derived either from fossils or earth waxes such as Ozocerite, Ceresian and Montan or the like, or those derived from petroleum waxes such as parafin wax, microcrystalline wax (slack or scale wax) or the like.

The synthetic wax such as polymeric waxes, e.g. ethylenic polymer wax such as polymethylene wax, polypropylene wax, polyethylene wax, polyoletheresters waxes (carbowax or sorbitol) chlorinated naphthalene (Halo-wax), hyrocarbon type via Fischer-Tropsch synthesis and the like.

The coupling agents can be employed in the instant invention, e.g. those from organic or organo-metallic nature such as abietic acid, linoletic acid, silylating agents, isocyanates, titanates, zirconates, aluminates, sterates or the like.

The silyating coupling agents are such as those described in the U.S. Pat. No. 4,820,749, columns 3 and 4, or the like.

The titanates are such as those described in the Modern Plastic Encyclopedia, 1986–1987, pp. 128 and 130, or the like.

The isocyanates are such as polymethylenepolyphenylisocyanates (PMPPIC), 1,6 hexamethylene diisocyanates and $NCO-(CH_2)$ 6-NCO, 2,4 toluene diisocyanate or their oligomers or the like.

This invention will now be furtherly described by nonlimiting examples.

The results can be optimized by optimising the weight ratios of the materials, preparations and conditions.

EXAMPLES

EX. 1

0.5 g of dicumyl peroxide is added to 100 g of hot-molten and stirred paraffin wax. The stirring is continued for 5 minutes, then cooled down to be employed for the other following examples.

EX. 2

4 g of:
a) Silane A-172 Union Carbide (Vinyltri (2-methoxyethoxy) silane);
b) Silane A-1100 Union Carbide (gamma-aminopropyltriethoxysilane);
c) Polymethylenepolyphenylisocyanate (PMPPIC) is added to 100 g of hot-molten and stirred paraffin wax as per example 1., but in absence of the peroxide. Then cooled down to be applied for the other following examples.

EX. 3

Same method of preparation as in example No. 1, in addition to the coupling agents of ex. 2., to give 3-a), 3-b) and 3-c), which can be added gradually 5 minutes after the addition of the initiator. The stirring is continued for another 5 minutes, then left to cool down to be employed for the other following examples.

EX. 4

30 g. of waxes prepared as per examples No. 1., 2-a) and 3-a) are individually sprayed while hot-molten onto bleached cartons (1 $m^2$), then left to cool down. The coated cartons are once again subjected for coating with LLDPE film running from laboratory film Extruder. Those coated carton samples are aged at 22° C. and at 50% humidity for thirty days. The average adhesion level is tested for said samples. The testing results are as per the following table No. 1.:

TABLE No. 1

| Carton coated with wax | Average adhesion level grams$^{-F}$ |
| --- | --- |
| Cartons coated with:-non-treated wax | 22.34 |
| Wax as per ex. No.1 | 26.12 |
| Wax as per ex. No.2-a | 32.11 |

TABLE No. 1-continued

| Carton coated with wax | Average adhesion level grams-$F$ |
|---|---|
| Wax as per ex. No.2-a) | 126.00 |

In this table, it is very remarkable that the adhesion of LLDPE is dramatically improved almost six times based on the non-treated waxes cartons. This is referring to the high bonding effect of the grafted paraffin wax with silane bonding agent.

EX. 5

Same type of preparations of example 4., but here the carton is substituted with cotton fabrics (1 m$^2$). The adherence forces show their maximum values by employing the wax of 3-a), i.e. the grafted wax with silane 172. The polyethylene film strongly bonded and penetrated into the fabric fibers.

EX. 6

Each 5 g. of the hot-molten waxes of examples 1, 2,a, b and c and 3,a, b and c are hot-molten sprayed over stirred 100 g. of chemicalthermomechanical aspen pulp. 30 g. of this sprayed pulp is compounded with 70 g. hot-nolten LLDPE, ABS, PP & PVC by using laboratory mixing Brabender. Hot-compression moulding of the different resulted composite samples are prepared and tested. The testing results demonstrated in Tables 2, 3, 4 and 5.

TABLE No. 2 FOR LLDPE

| 30 g. Fiber-coated with 5% prepared waxes as per examples Nos. | Stress MPa | Energy KJ × 10$^5$ | Modulus MPa |
|---|---|---|---|
| 0 filled | 14.8 | 20.4 | 435 |
| 1 | 15.2 | 21.3 | 440 |
| 2-a | 21.2 | 25.4 | 514 |
| 3-a | 35.1 | 67.2 | 2344 |
| 2-b | 19.7 | 24.1 | 498 |
| 3-b | 32.4 | 58.1 | 1813 |
| 2-c | 18.4 | 23.1 | 506 |
| 3-c | 28.1 | 52.3 | 1790 |

TABLE No. 3 FOR ABS RESIN

| 30 g. Fiber-coated with 5% prepared waxes as per examples Nos. | Tensile Strength MPa | Flexural Modulus GPa | Notched Izod KJ/M |
|---|---|---|---|
| Non-filled | 37.0 | 2.5 | 0.2 |
| 1 | 38.5 | 2.6 | 0.3 |
| 2-a | 41.0 | 2.7 | 0.4 |
| 3-a | 58.0 | 3.6 | 0.7 |
| 2-b | 40.0 | 2.7 | 0.4 |
| 3-b | 52.0 | 3.8 | 0.8 |
| 2-c | 39.0 | 2.8 | 0.5 |
| 3-c | 54.0 | 3.1 | 0.7 |

TABLE No. 4 FOR PP

| | | | |
|---|---|---|---|
| Non-filled | 23.0 | 2.5 | 0.03 |
| 1 | 25.0 | 2.6 | 0.04 |
| 2-a | 28.0 | 2.8 | 0.08 |
| 3-a | 47.0 | 3.8 | 0.19 |
| 2-b | 28.0 | 2.8 | 0.07 |
| 3-b | 46.0 | 3.7 | 0.20 |
| 2-c | 27.0 | 2.9 | 0.09 |
| 3-c | 46.0 | 3.8 | 0.18 |

TABLE No. 5 FOR P.V.C. RESIN

| 30 g. Fiber-coated with 5% prepared waxes As per examples Nos. | Tensile Strength MPa | Flexural Modulus GPa | Notched Izod KJ/M |
|---|---|---|---|
| Non-filled | 22 | 15 | 0.2 |
| 1 | 21 | 16 | 0.3 |
| 2-a | 24 | 17 | 0.5 |
| 3-a | 35 | 22 | 1.6 |
| 2-b | 24 | 16 | 0.4 |
| 3-b | 33 | 21 | 1.4 |
| 2-c | 26 | 17 | 0.4 |
| 3-c | 39 | 23 | 1.7 |

TABLE No. 6 FOR PP

| 40 wt. % of pre-treated CaCo$_3$ with wax prepared As per examples Nos. | Tensile Strength MPa | Flexural Modulus GPa | Notched Izod KJ/M |
|---|---|---|---|
| Non-filled | 23 | 2.5 | 0.03 |
| 1 | 24 | 2.6 | 0.05 |
| 2-a | 27 | 2.7 | 0.17 |
| 3-a | 45 | 3.9 | 0.29 |
| 2-b | 26 | 2.8 | 0.16 |
| 3-b | 43 | 3.8 | 0.28 |
| 2-c | 36 | 2.7 | 0.18 |
| 3-c | 44 | 3.7 | 0.29 |

TABLE No. 7

| | | | |
|---|---|---|---|
| Non-filled | 23 | 2.5 | 0.03 |
| 1 | 24 | 2.7 | 0.05 |
| 2-a | 32 | 2.8 | 0.18 |
| 3-a | 47 | 4.1 | 0.28 |
| 2-b | 26 | 2.8 | 0.17 |
| 3-b | 45 | 3.8 | 0.24 |
| 2-c | 37 | 2.8 | 0.18 |
| 3-c | 43 | 3.9 | 0.20 |

EXAMPLE No. 7

As per ex. 6, but the wood pulp is substituted with 40% of calcium carbonate and compounded with polypropylene. The testing results are demonstrated in Table No. 6.

EXAMPLE No. 8

As per ex. 6, but the wood pulp is premixed with 10% of calcium carbonate and compounded with ABS resin. The testing results are shown in Table No. 7.

EXAMPLE No. 9

500 g of spruce wood wafers of 5% humidity are well mixed by spraying with 10 g. of hot-molten prepared wax of ex. 1, 2-a and 3-a. 10 g. of BD-019 Reichold phenolic powdered resin are well mixed with the coated wood wafers, and then molded by hot pressing at 180° C. for 5 minutes and at density 610 kgm/m$^3$ for obtaining board samples having thickness 11.1 mm. The internal bond strength is determined by testing specimens in tension perpendicular to the plane of the board specimens. The test was carried out according to CSA 0188 in reference to the commercial boards. The results are shown in table 8.

TABLE No. 8

| | Internal bond psi |
|---|---|
| Commercial particles board specimens | 85 |
| Treated with wax of Ex. 1 | 88 |
| Treated with wax of Ex. 2-a | 98 |
| Treated with wax of Ex. 3-a | 242 |

EXAMPLE No. 10

Polypropylene Wax as an adhesive

Polypropylene wax is treated with 0.5% of dicumylperoxide as per ex. 1., with 4% silane 172 as per ex.2-a, and with both as per ex.3-a. Then is used to adhere aluminium/aluminium and steel/steel. The shear strength is tested and the results are demonstrated in Table No. 9.

TABLE No. 9

|  | Shear Strength MPa |
|---|---|
| Non-treated | 6.5 |
| Treated as per ex. 1 | 7.1 |
| Treated as per ex. 2-a | 8.2 |
| Treated as per ex. 3-a | 14.0 |

EXAMPLE No. 11

Grafted PP Wax as a Bonding Agent

5% w/w of the grafted polypropylene wax with silane A-172 prepared as per ex.10, is compounded with 30% w/w aspen pulp and 65% w/w of polypropylene. The tested results are shown in Table No. 10.

TABLE No. 10

|  | Tensile St. MPa | Fluxural Modulus GPa | Notched Izod KJ/M |
|---|---|---|---|
| Non-filled PP | 23 | 2.5 | 0.03 |
| 30% wood pulp as per ex. 11 | 47 | 3.8 | 2.01 |

EXAMPLE No. 12

Water Repellency and dimentional stability of wood

Spruce wood cut in small pieces in 4×2×½ inches. The direction of the fibers are parallel to the smallest dimention. The pieces are dried at 60° C. for 24 hours and then coated with 4% w/w of the hot-molten sprayed waxes of examples Nos. 1, 2-a and 3-a. The coated wood pieces are kept for ½-1 hour at 60° C. The coated wood pieces are weighed accurately and their dimentions are measured. The samples are soaked in water for 24 hours and the wood samples are left to dry at lab. temperature. The water uptake and the expansion percentage are calculated and the results are as per Table No. 11.

TABLE No. 11

| Wood Sample | Water uptake after | | Expansion % after | |
|---|---|---|---|---|
|  | 1 hr. | 24 hr. | 1 hr. | 24 hr. |
| Non-treated | 8.2 | 3.1 | 3.5 | 6.5 |
| Treated as per |  |  |  |  |
| ex. 1 | 6.1 | 3.6 | 2.7 | 4.8 |
| ex. 2-a | 4.0 | 2.9 | 2.4 | 3.1 |
| ex. 3-a | 1.0 | 2.1 | 1.9 | 2.6 |
|  | +++ | +++ | +++ |  |

Various modifications and variations of the invention will be readily apparent to those skilled in the art. It is to be understood that such modifications and variations are to be included within the purview of this invention and the spirit of the present claims.

I claim:

1. A composition to be employed as a surface coating agent, an interfacial coupling agent, or a bonding material comprising a wax that has been grafted with a coupling agent selected from the group consisting of zirconates, titanates, alumino-zirconates, silanes and isocyanates, by a free radical grafting process.

2. The composition of claim 1 wherein said wax is selected from the group consisting of animal waxes, vegetable waxes and mineral waxes.

3. The composition of claim 1 wherein said wax material is grafted with said coupling agent by a free radical initiation by an initiator selected from the group consisting of peroxides.

4. The composition of claim 1 further comprising an ethylenically unsaturated acid or acid anhydride.

5. The composition of claim 4 wherein said anhydride is selected from the group consisting of maleic anhydride and acetic anhydride.

6. The composition of claim 1 further comprising a material selected from the group consisting of organic and inorganic fillers.

7. The composition of claim 6 further comprising a material selected from the group consisting of polymers, asphalts and cements.

8. The composition of claim 1 further comprising a material selected from the group consisting of polymers, asphalts and cements.

* * * * *